US007464945B2

(12) United States Patent
Humphries et al.

(10) Patent No.: US 7,464,945 B2
(45) Date of Patent: Dec. 16, 2008

(54) APPARATUS FOR USE IN THE STORAGE AND TRANSPORTATION OF RECYCLABLE WASTE

(76) Inventors: Glynn Humphries, 2 Oak Rise, Pontefract, West Yorkshire (GB) WF8 2WD; Christopher John Jackson, Southgate, Crossways, Winchester, Hampshire (GB) SO21 2BZ ( * ) Notice: Subject to any disclaimer, the term of this patent is extended or adjusted under 35 U.S.C. 154(b) by 531 days.

(21) Appl. No.: 10/553,302

(22) PCT Filed: Apr. 19, 2004

(86) PCT No.: PCT/GB2004/001689

§ 371 (c)(1),
(2), (4) Date: Oct. 15, 2005

(87) PCT Pub. No.: WO2004/094268

PCT Pub. Date: Nov. 4, 2004

(65) Prior Publication Data

US 2006/0197297 A1 Sep. 7, 2006

(30) Foreign Application Priority Data

Apr. 17, 2003 (GB) ................................ 0308932.3
Aug. 18, 2003 (GB) ................................ 0319343.0

(51) Int. Cl.
*B62B 1/00* (2006.01)

(52) U.S. Cl. .............................. 280/47.26; 280/33.991; 280/33.998; 280/43.1; 280/47.131; 280/47.24; 280/47.19; 248/128; 248/129

(58) Field of Classification Search .............. 280/47.26, 280/33.991, 43.1, 47.131, 47.24, 47.19, 33.998; 248/128, 129; D34/24, 25, 26; 108/92; 211/126.1; 312/330.1

See application file for complete search history.

(56) References Cited

U.S. PATENT DOCUMENTS 3,891,230 A * 6/1975 Mayer ..................... 280/43.24

(Continued)

FOREIGN PATENT DOCUMENTS

DE 3510472 A1 10/1986

(Continued)

*Primary Examiner*—Christopher P Ellis
*Assistant Examiner*—Jacob Meyer
(74) *Attorney, Agent, or Firm*—John V. Stewart

(57) ABSTRACT

An apparatus for use in the storage and transportation of recyclable waste comprises a housing (10) having a bottom (16) for standing on the ground, a rear wall (20), a pair of opposed side walls (22), a handle (26) adjacent the top and rear of the housing, and a pair of wheels (28) adjacent the bottom and rear of the housing and arranged such that the housing can be tipped rearwardly using the handle so that the wheels engage the ground, so that the bottom of the housing no longer engages the ground and so that the apparatus can be moved on the wheels using the handle to move it. The housing provides at least one space (48) accessible from the front of the housing, the or each space being arranged to receive at least one recycling box (12) having a base (30), four side walls (32) and an open top. The apparatus has a platform, runners or the like (14,52,64,86) for supporting the or each recycling box in its space such that the or each recycling box can be slid into the housing from the front and such that when the or each recycling box is in the housing the front-facing side wall(s) of the recycling box(es) substantially close(s) the front of the housing and the recycling boxes are covered. Existing recycling boxes can be used. When the recycling box(es) are slid into the housing, their contents are protected from the elements, and they can be moved by a householder on collection day without any need for lifting.

15 Claims, 7 Drawing Sheets

U.S. PATENT DOCUMENTS

| | | | | | |
|---|---|---|---|---|---|
| 4,118,048 | A * | 10/1978 | Spranger et al. | ......... | 280/47.35 |
| 5,028,099 | A | 7/1991 | Bertucco | | |
| 5,339,980 | A * | 8/1994 | Stutler | ........................ | 220/571 |
| 5,427,394 | A * | 6/1995 | Lauto | ...................... | 280/47.35 |
| 5,445,397 | A * | 8/1995 | Evans | ...................... | 280/47.18 |
| 6,079,719 | A * | 6/2000 | Tisbo et al. | .............. | 280/47.35 |
| 6,086,073 | A * | 7/2000 | Tisbo et al. | .............. | 280/47.26 |
| 6,123,344 | A * | 9/2000 | Clegg | ...................... | 280/47.19 |
| 6,550,792 | B1 | 4/2003 | Salmon et al. | | |
| 6,722,672 | B2 * | 4/2004 | Cates et al. | .............. | 280/47.26 |
| 6,953,199 | B2 * | 10/2005 | Malloy, III | ............... | 280/47.26 |
| 2004/0108666 | A1 * | 6/2004 | Lauer | .................... | 280/33.998 |

FOREIGN PATENT DOCUMENTS

| | | | |
|---|---|---|---|
| DE | 8900424.8 | U1 | 3/1989 |
| DE | 9012396.4 | U1 | 10/1991 |
| DE | 9419241.3 | U1 | 1/1995 |
| FR | 2683511 | A1 | 5/1993 |
| FR | 2724914 | A1 | 3/1996 |
| FR | 2780958 | A1 | 1/2000 |
| GB | 2240914 | A | 8/1991 |
| GB | 2351958 | A | 1/2001 |
| WO | WO91/05720 | A1 | 5/1991 |

* cited by examiner

FIG. 1
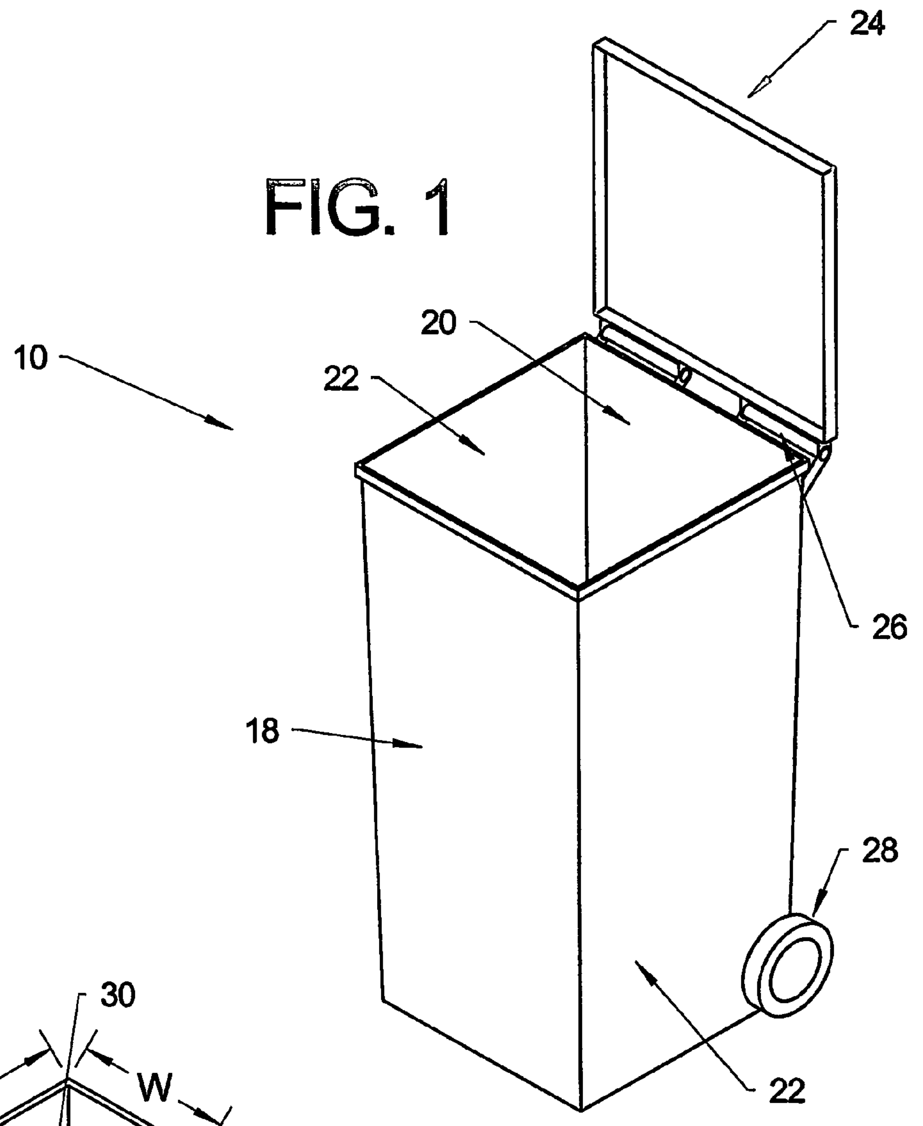
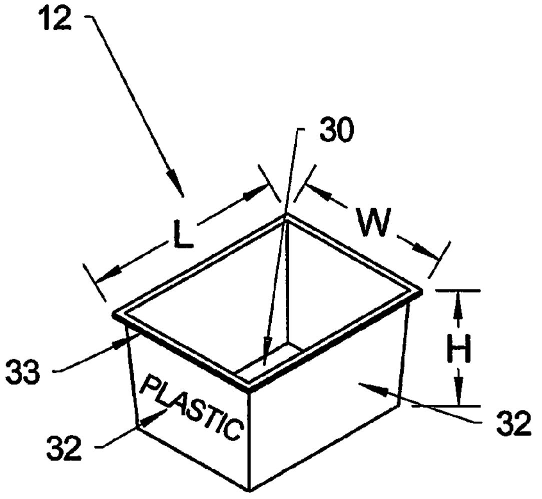
FIG. 2

FIG. 4
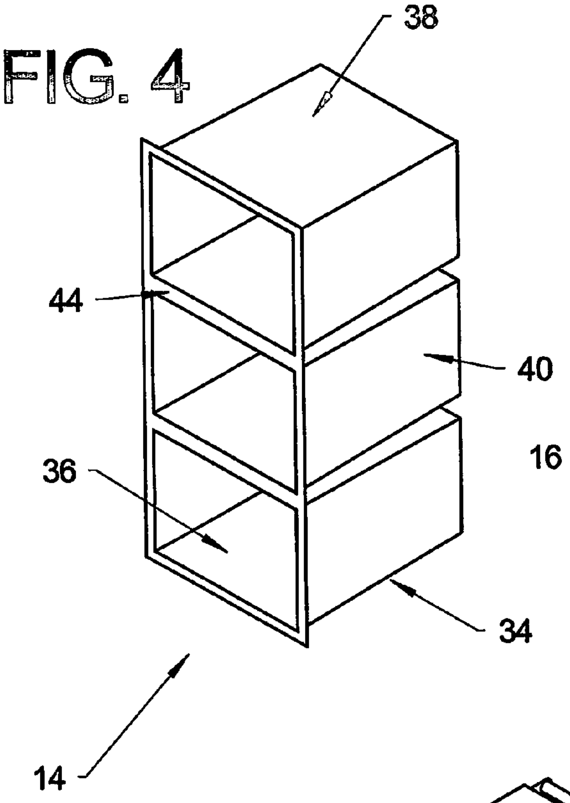
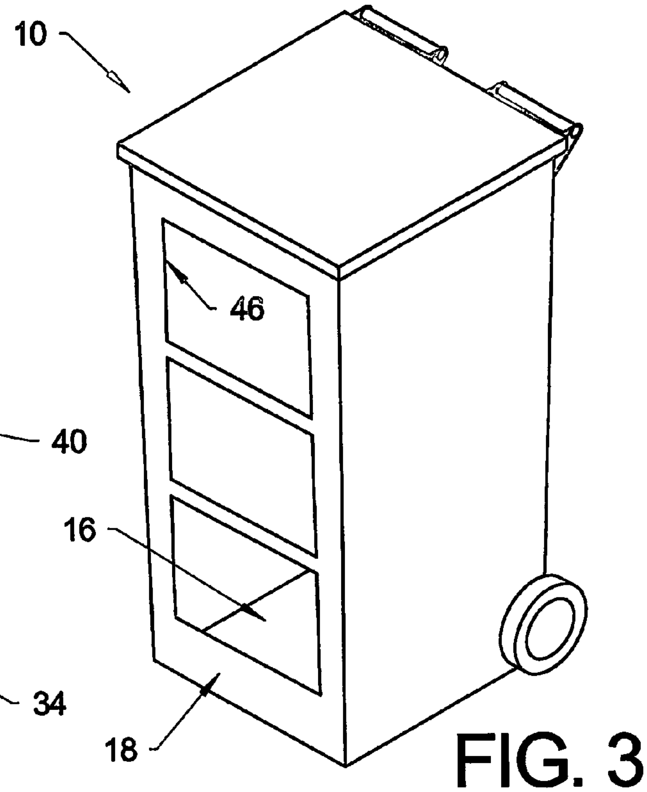
FIG. 3
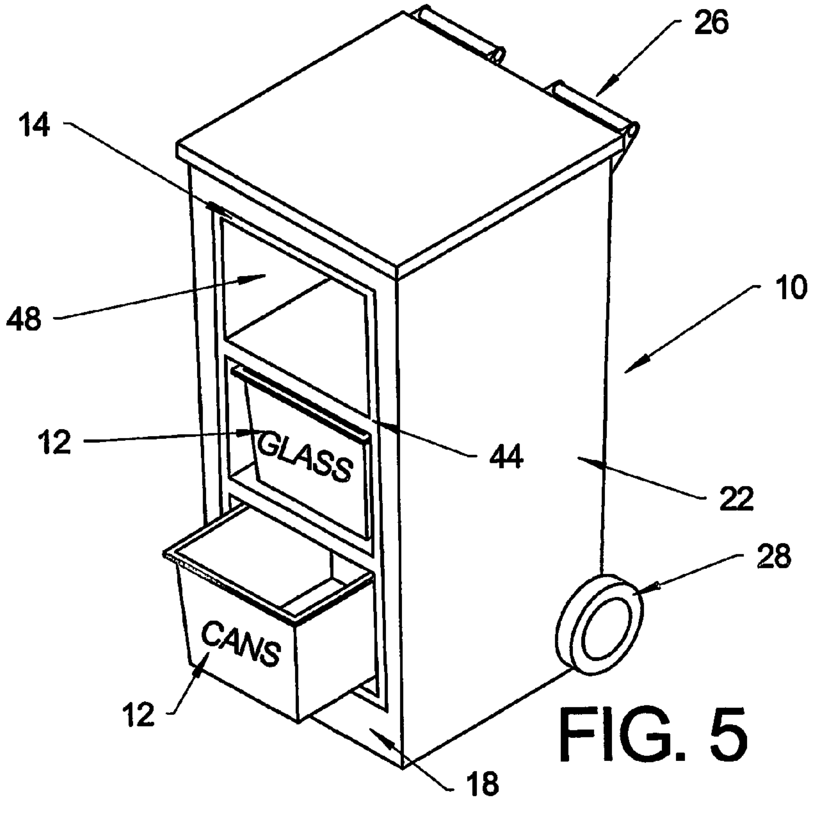
FIG. 5

FIG. 10
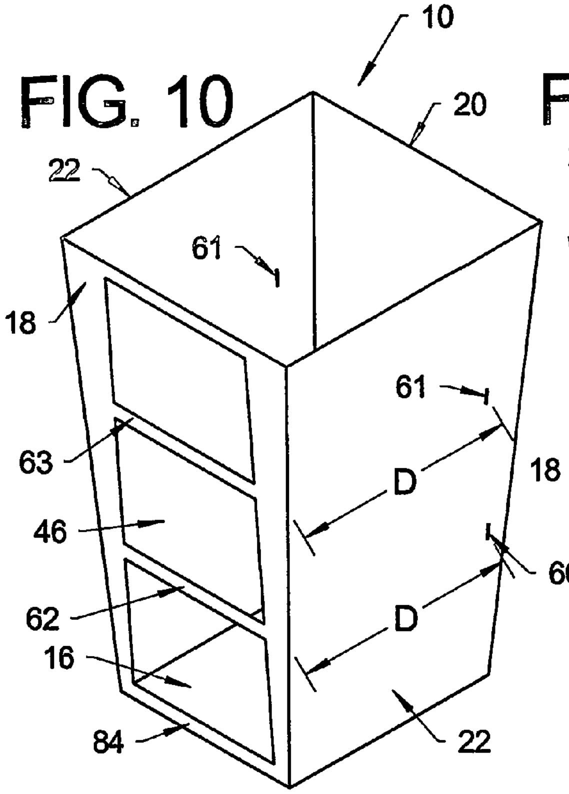
FIG. 12
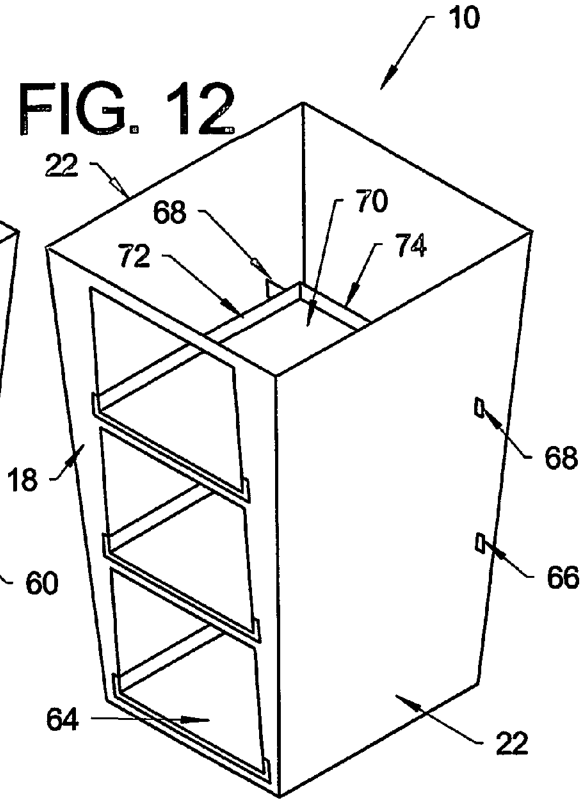
FIG. 11
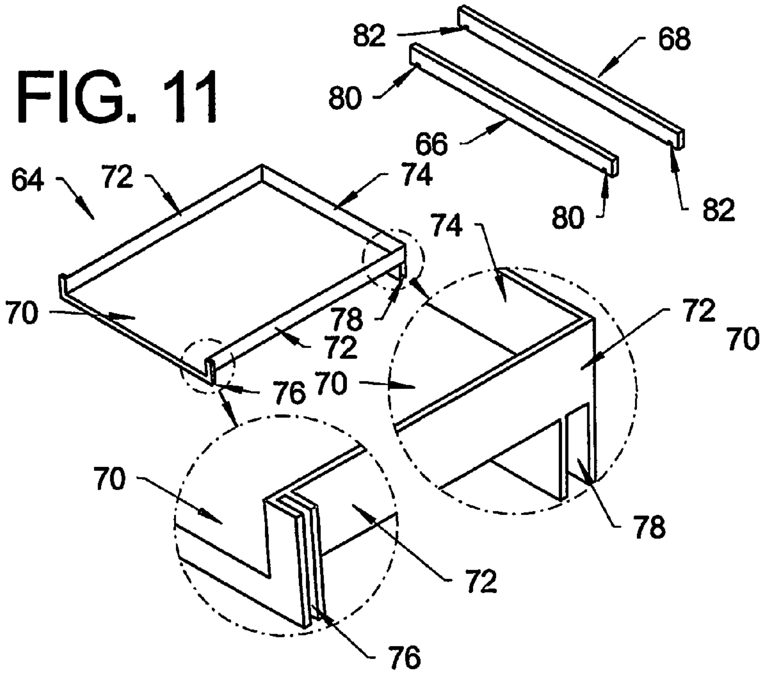
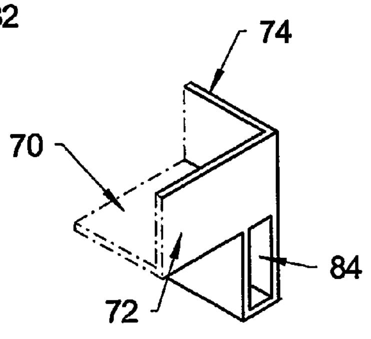
FIG. 13

FIG. 14
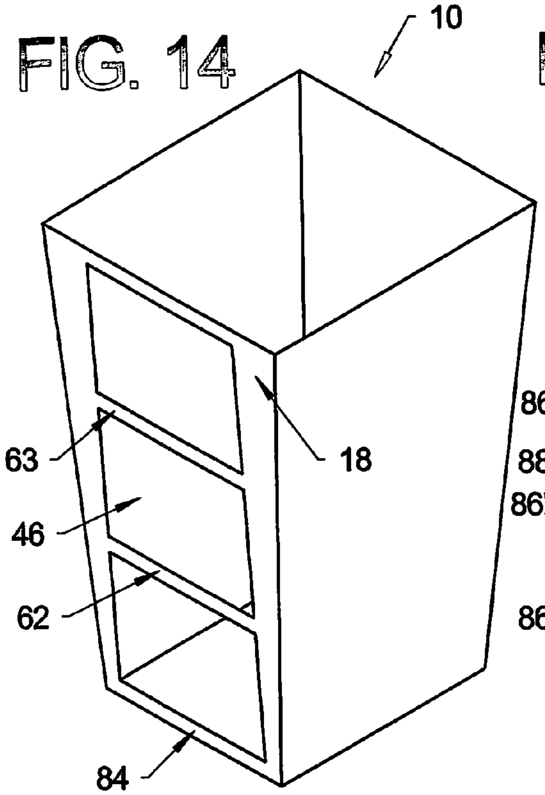
FIG. 17
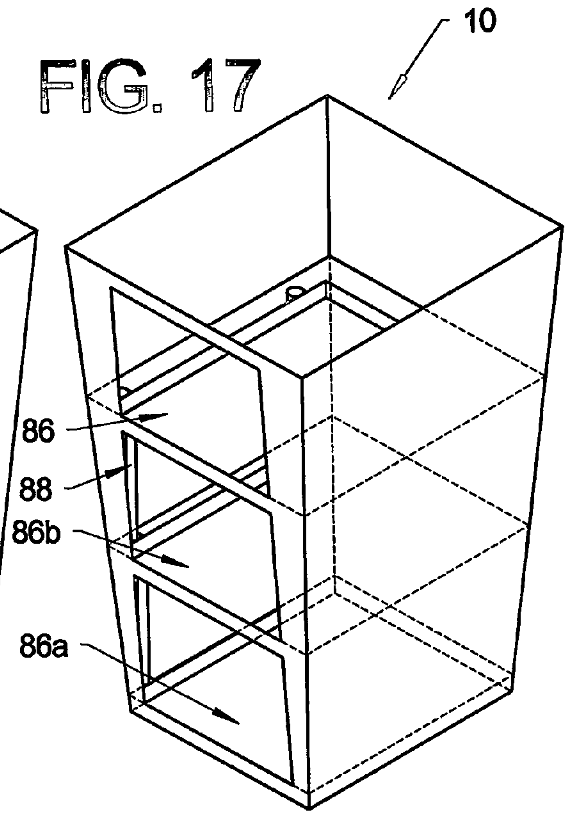
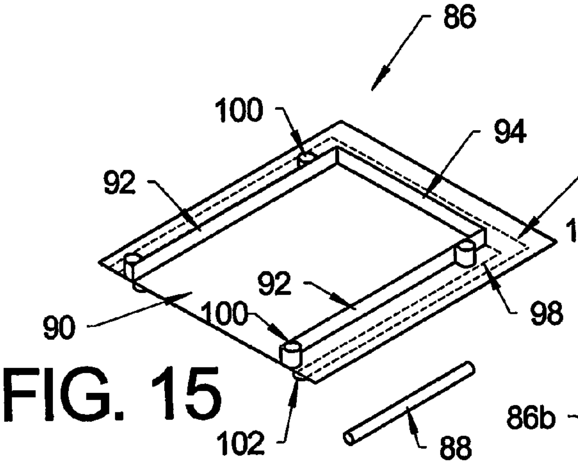
FIG. 15
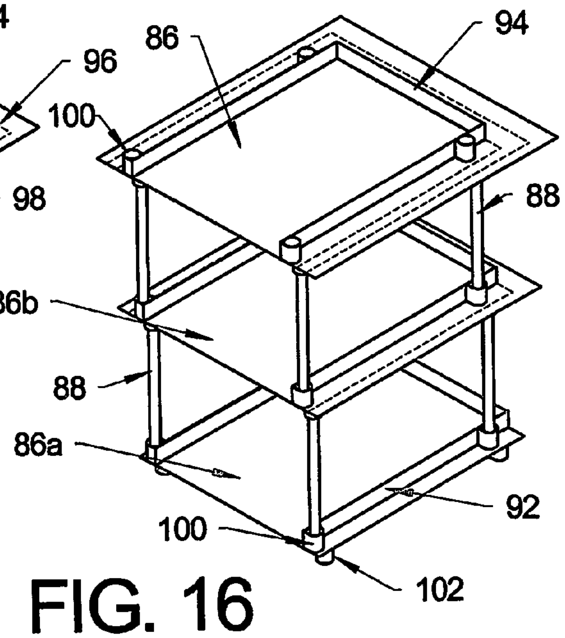
FIG. 16

APPARATUS FOR USE IN THE STORAGE AND TRANSPORTATION OF RECYCLABLE WASTE

DESCRIPTION

This invention relates generally to the storage and transportation of recyclable waste, and more particularly to an apparatus for use in the storage and transportation of recyclable waste, a method of manufacture of such an apparatus, a method of collection of recyclable waste from a neighbourhood of residential properties, and to such a neighbourhood per se.

In years gone past, little recycling of domestic refuse was carried out, and the Earth's resources were wasted. More recently, recycling has become more popular, and in the UK, for example, there are government incentives such as landfill tax and targets to encourage recycling. In the UK some years ago, bottle banks and paper banks were set up in many areas, and householders were requested to take their waste glass, paper and cardboard to such banks. Such schemes had limited success because householders had to go out of their way to recycle their waste. In many boroughs in the UK, wheelie bins (see FIG. 1 of the accompanying drawings) are now used for the storage and collection of refuse, and in some boroughs two wheelie bins are provided for each household, usually a green or grey bin for certain types of recyclable waste and a black bin for other waste. After collection, the contents of the green bins are sorted by the local authority (or their contractor) into the different categories of recyclable material, for example different colours of glass, paper and card, ferrous metal, aluminium, other metals and plastics. A considerable amount of sorting needs to be carried out by the local authority. Some local authorities have attempted to involve householders more in the sorting process by providing several recycling boxes (smaller than a wheelie bin or old-fashioned dustbin and each typically having a capacity of 40 to 60 liters—see FIG. 2 of the accompanying drawings) for each household and persuading householders to separate out, from their general waste, recyclables such as glass, paper and card, recyclable plastics, and cans and other metal waste. These schemes are meeting with greater success than the bottle and paper banks, because the householder does not need to leave their property as part of the process, because the local authority can impose the sanction of refusing to collect refuse that had not been properly sorted and because the idea of recycling has now caught on more. It is estimated that, in April 2003, there were in excess of ten million such recycling boxes in use in the United Kingdom.

There are, however, problems with the recycling box schemes. The boxes are normally kept out-of-doors, where they and/or their contents can be blown around by the wind. If lids are provided for the boxes, they can be blown away and lost, or used by children like a Frisbee®.

Without a lid, the recyclables get wet in the rain and so paper and card get sodden and ferrous metals go rusty, and pets use the boxes for their toilet. On collection day, the boxes need to be lifted and carried from their normal storage place, for example on the ground outside the back door, to the collection point, for example on the pavement outside the house. The boxes are usually stored next to each other on the ground and take up a significant amount of ground area The present invention, or at least specific embodiments of it, addresses these problems associated with recycling box schemes.

In accordance with one aspect of the present invention, there is provided an apparatus for use in the storage and transportation of recyclable waste, the apparatus comprising a housing having a bottom for standing on the ground, a rear wall, a pair of opposed side walls, a handle adjacent the top and rear of the housing, a pair of wheels adjacent the bottom and rear of the housing and arranged such that the housing can be tipped rearwardly using the handle so that the wheels engage the ground, so that the bottom of the housing no longer engages the ground and so that the apparatus can be moved on the wheels using the handle to move it, the housing providing at least one space accessible from the front of the housing, the or each space being arranged to receive at least one recycling box having a base, four side walls and an open top, the apparatus having means for supporting the or each recycling box in its space such that the or each recycling box can be slid into the housing from the front and such that when the or each recycling box is in the housing the front-facing side wall(s) of the recycling box(es) substantially close(s) the front of the housing and the recycling boxes are covered. When the recycling box(es) are slid into the housing, their contents are protected from the elements, and they can be moved by a householder on collection day without any need for lifting. (It should be noted that the bottom of the housing need not be closed and may be provided by the bottom edges of the walls of the housing.)

The housing preferably provides a plurality of such spaces arranged one above another in the housing so that the housing can take up less ground area than the ground area that would be taken up by a plurality of recycling boxes arranged side-by-side on the ground.

In one embodiment, the housing provides a platform beneath the or each space onto which the respective recycling box can be slid. The compartment can therefore accept a range of sizes of recycling box. However, if the apparatus is to be used only with recycling boxes of one particular size, in another embodiment, the housing provides a pair of runners to either side of the or each space onto which opposed lips of the respective recycling box be slid.

The top of the housing preferably has a hinged lid providing access to a top compartment of the housing. In this case, the sides of the top compartment may be provided by the rear wall, the side walls and a front wall of the housing. Alternatively, the top compartment may be arranged to receive a removable recycling tray, or may have a base and side walls to form an integral recycling tray.

In one embodiment, the housing and supporting means are formed as a single moulding. However, in another preferred embodiment, the housing is formed as a moulding providing at least the side walls and a rear wall of the housing, and the supporting means and wheels are attached to the housing after it has been moulded. In this case, the housing is preferably arranged such that, prior to attachment of the supporting means and wheels, a plurality of identical such housings can be stacked one substantially inside another, so as to take up less space prior to the housings being put to use. Preferably, the housing is substantially identical to a housing of a standard wheelie bin except for the omission of at least part of the front wall thereof. If a wheelie bin mould is already available, this therefore reduces the tooling-up costs.

The supporting means may include at least one open-fronted box portion and a flange around the open front of the box portion for abutting the housing. In this case, the box portion preferably has converging walls so that, prior to assembly of the housing and supporting means, a plurality of such supporting means can be stacked one inside the next.

This enables space to be saved during transportation between the factory and the place of assembly of the housings and supporting means.

The supporting means may include an element that is arranged to be supported at least in part by a front wall of the housing. Alternatively, the supporting means may include at least two elements at least one of which is arranged to be supported at least in part by another of the elements.

In accordance with a second aspect of the invention, there is provided an apparatus according to the first aspect of the invention, in combination with at least one such recycling box. Of course, in the case where more than one compartment is provided, a corresponding number of such recycling boxes are preferably also provided. In this case, the recycling boxes preferably have substantially identical sizes.

The or each recycling box may be a standard recycling box, for example having a volumetric capacity in the range of 33 to 60 liters (and more preferably in the range of 40 or 50 to 60 liters), an external height in the range of 0.26 to 0.36 m, an external width in the range of 0.38 to 0.48 m and/or an external length in the range of 0.51 to 0.63 m.

In the case where the housing provides a pair of runners to either side of the or each compartment, the or each recycling box preferably has a pair of opposed lips along the upper edges of an opposed pair of side walls of that box for engaging the pair of runners of the respective space.

In the case where the housing is substantially identical to a housing of a standard wheelie bin except for the omission of at least part of the front wall thereof, a third aspect of the invention provides a method of manufacture of such an apparatus, the method comprising the steps of moulding a housing of a standard wheelie bin, removing at least part of the front wall therefrom to form the housing of the apparatus, manufacturing the supporting means, and attaching the supporting means to the housing. A main part, if not the majority, of the apparatus can therefore be moulded using an existing mould.

Alternatively, a fourth aspect of the invention provides a method of manufacture of such an apparatus, the method comprising the steps of modifying a mould for a housing of a standard wheelie bin so that the mould produces a housing substantially identical to a standard wheelie bin except for the omission of at least part of the front wall thereof, moulding such a housing, manufacturing the supporting means, and attaching the supporting means to the housing. A main part, if not the majority, of the apparatus can therefore be moulded using an existing mould with only minor modification.

Preferably, a plurality of such housings are manufactured that are stackable, the housings are stacked one substantially inside another at a first location (such as the factory), the stacked housings are transported to a second location (such as a neighbourhood where the apparatuses as to be put to use) remote from the first location, the housings are unstacked at the second location, and the supporting means are subsequently attached to the housings. This can significantly reduce the space occupied by the housings during transportation.

In accordance with a fifth aspect of the invention, in a neighbourhood of residential properties, at least the majority of the properties are each provided with a respective apparatus according to the first or second aspect of the invention. At least some, if not all, of the apparatuses are preferably identical.

In accordance with a sixth aspect of the invention, there is provided a method of collection of recyclable waste from a neighbourhood of residential properties, the method comprising the steps of providing at one time at least some of the properties each with at least one recycling box, then collecting recyclable waste from the recycling boxes, providing at a subsequent time (which may be a year or more later) those properties each with an apparatus according to the first aspect of the invention so that the apparatus and existing recycling box(es) at each of those properties form an apparatus according to the second aspect of the invention, and then collecting recyclable waste from the apparatuses. In other words, in order to obtain the benefits of the invention, it is possible to use existing recycling boxes, estimated to number in excess of ten million in the United Kingdom in April 2003.

For the purposes of the designation in this application of a United Kingdom patent and a European patent (UK), the invention also provides any of the above aspects of the invention that is not the same as the invention of patent GB2384970B as granted.

Specific embodiments of the present invention will now be described, purely by way of example, with reference to the accompanying drawings, all of which are isometric views, and in which:

FIG. 1 shows a conventional wheelie bin;

FIG. 2 shows a conventional recycling box;

FIG. 3 shows a modified form of the wheelie bin of FIG. 1;

FIG. 4 shows a moulding used with the modified wheelie bin of FIG. 3 to form a first embodiment of the invention;

FIG. 5 shows the apparatus of the first embodiment of the invention, with one recycling box omitted;

FIG. 10 shows another modified form of wheelie bin for use in a fifth embodiment of the invention, with its lid, handle and wheels omitted for simplicity;

FIG. 11 shows three additional types of moulding for use in the fifth embodiment with insets showing enlarged views of two portions of one of the mouldings;

FIG. 12 shows the fifth embodiment of the invention;

FIG. 13 shows a modification of a part of one of the mouldings of FIG. 11;

FIG. 14 shows another modified form of wheelie bin for use in a sixth embodiment of the invention, with its lid, handle and wheels omitted for simplicity;

FIG. 15 shows two additional types of moulding for use in the sixth embodiment;

FIG. 16 shows an assembly of the mouldings of FIG. 15;

FIG. 17 shows the sixth embodiment of the invention; and

Figure 6:
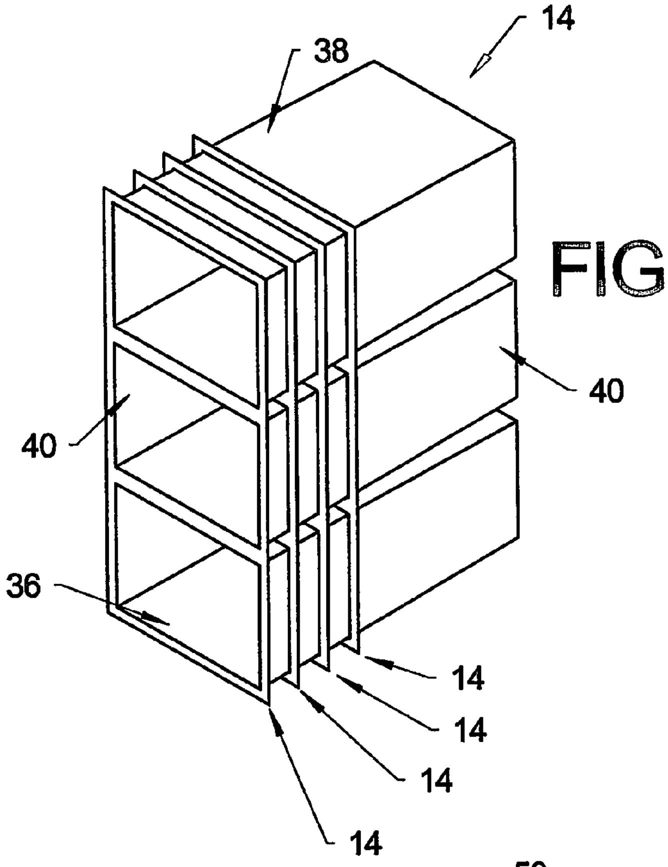
FIG. 6 shows a stack of the mouldings of FIG. 4.

Referring to FIGS. 1 to 5 of the drawings, the first embodiment of the invention as shown in FIG. 5 employs a conventional standard wheelie bin 10 as shown in FIG. 1, three conventional standard recycling boxes 12 as shown in FIG. 2 and an additional compartment moulding 14 as shown in FIG. 4.

As is well-known, the wheelie bin 10 has a base 16, a front wall 18, a rear wall 20, a pair of side walls 22, a lid 24 that is hinged to the top of the rear wall 20 by an arrangement that provides a pair of handles 26, and a pair of wheels 28 on a common axis adjacent the bottom of the rear wall 20. The front and rear walls 18,20 and the side walls 22 converge slightly towards the base 16 so that, with the lids 24 open and wheels 28 removed, a plurality of such wheelie bins 10 can be stacked one inside the next to save space during transportation between the factory and the end-user. As is also well-known, each recycling box 12 is open-topped and has a base 30, four side walls 32 and an outwardly-extending lip 33 around the tops of the side walls 32. Again, the side walls 32 converge slightly towards the base 30 so that plurality of such recycling boxes 12 can be stacked one inside the next to save space during transportation between the factory and the end-user. Typically, the recycling box 12 would have a capacity of 53 liters and external dimensions W×L×H of 440 mm×570 mm×330 mm.

The compartment moulding 14 is formed as three similar open-fronted boxes 34 each having a base 36, a top wall 38, a pair of side walls 40 and a rear wall. The boxes 34 are integrally joined together in a row by a flange portion 44 around the open fronts of the boxes 34. Each open-fronted box 34 is sized interiorly to accommodate a recycling box 12 and for the recycling box described above may have an interior width, depth and height of 480 mm×570 mm×360 mm.

In order to provide the first embodiment of the invention, three rectangular holes 46 are cut, one above another, in the front wall 18 of the wheelie bin 10, as shown in FIG. 3. The holes 46 have a vertical pitch equal to the vertical pitch of the boxes 34 of the compartment moulding 14. The width of each hole 46 is slightly larger than the exterior width of each box 34 immediately behind the flange portion 44, and the height of each hole 46 is slightly larger than the exterior height of each box 34 immediately behind the flange portion 44. The compartment moulding 14 is assembled with the wheelie bin 10 by inserting the boxes 34 into the holes 46 and fixing the flange portion 44 to the front wall 18 of the wheelie bin 10, for example with adhesive, welding, snap-fit formations or screws. Accordingly, as shown in FIG. 5, three vertically-aligned, open-fronted compartments 48 are provided in the wheelie bin 10, into each of which a respective recycling box 12 can be slid, being supported by the base 36 of the respective open-fronted box. When all three recycling boxes 12 are fully inserted into their compartments, the front walls 32 of the boxes 12 substantially close the front wall 18 of the wheelie bin 10. The top of each recycling box 12 is covered by the respective top wall 38 of the respective open-fronted box 34 to protect the contents of the recycling box 12 from the elements. By being shrouded by the wheelie bin 10, the recycling boxes 12 are unlikely to be blown away in the wind.

Figure 18:
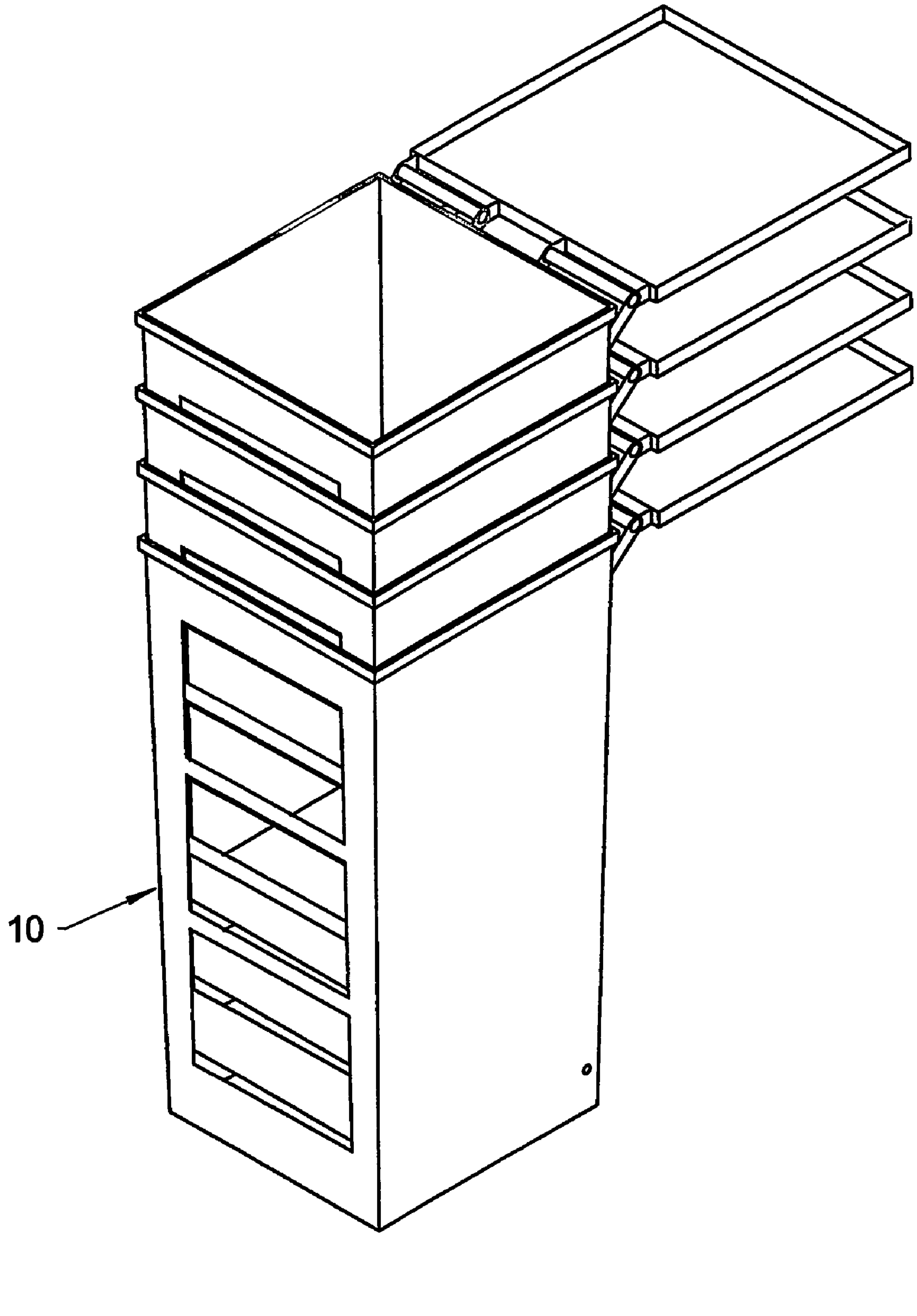
FIG. 18 shows a stack of the modified wheelie bins of FIG. 3.

As shown in FIG. 6, the base 36, top 38 and side walls 40 of each open-fronted box 34 of the compartment moulding 14 converge slightly towards the rear wall so that a plurality of such compartment mouldings 14 can be stacked one inside the next to save space during transportation between the factory and the place of assembly of the compartment mouldings 14 with the wheelie bins 10. Also, as shown in FIG. 18, prior to assembly of the wheels 28 with the wheelie bins 10 and of the wheelie bins 10 with the compartment mouldings 14, a plurality of the wheelie bins 10 can be stacked one inside the next similarly to save space.

In a modification to the first embodiment, instead of the three holes 46 being cut in the front wall 18 of the conventional wheelie bin 10, the mould for the wheelie bin 10 is modified so that the holes 46 are formed at the time of moulding of the wheelie bin 10.

Figure 7:
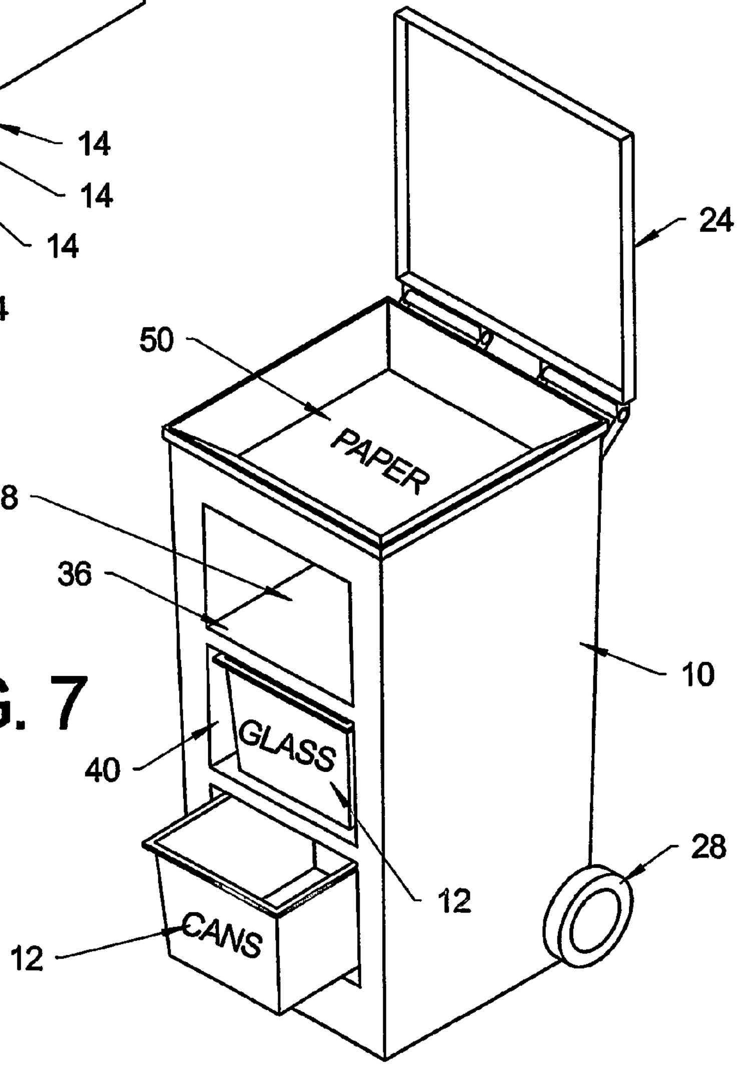
FIG. 7 shows a second embodiment of the invention.

The second embodiment of the invention, as shown in FIG. 7, is similar to the first embodiment except that the mould for the wheelie bin is modified so that the bases 36, tops 38, side walls 40 and rear walls of the compartments 48 are integrally moulded with the housing for the wheelie bin 10. Also, a shallow tray 50 at the top of the wheelie bin 10 is integrally moulded with front, rear wall and side walls 18,20,22 and is accessible by lifting the lid 24.

Figure 8:
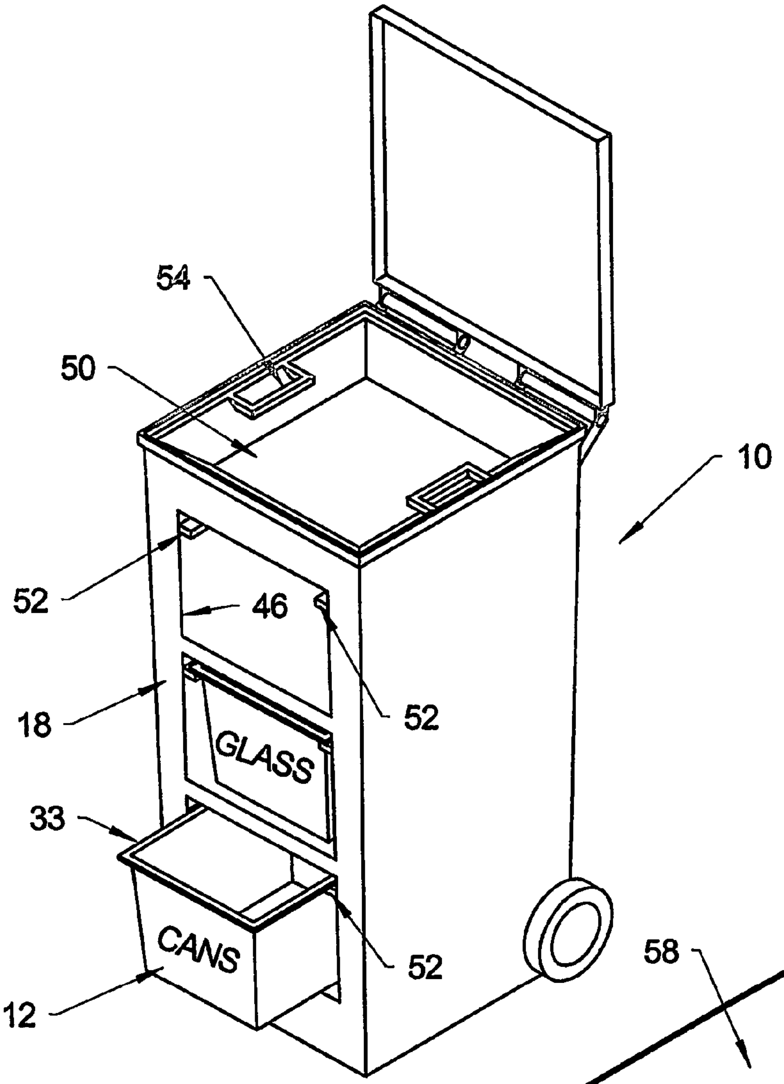
FIG. 8 shows a third embodiment of the invention.

The third embodiment of the invention, as shown in FIG. 8, is similar to the second embodiment except that, instead of providing a base 36, top 38, side walls 40 and rear wall for each compartment 48, a pair of generally-horizontal, mutually-parallel runners 52 are provided extending rearwardly from the respective hole 46 in the front wall 18 of the wheelie bin 10. The spacing of the runners 52 is such that they can support the recycling boxes 12 beneath their lips 33 and allow the recycling boxes 12 to be slid in and out. Also, in the third embodiment, the top tray 50 is removable and has a pair of lifting handles 54.

Figure 9:
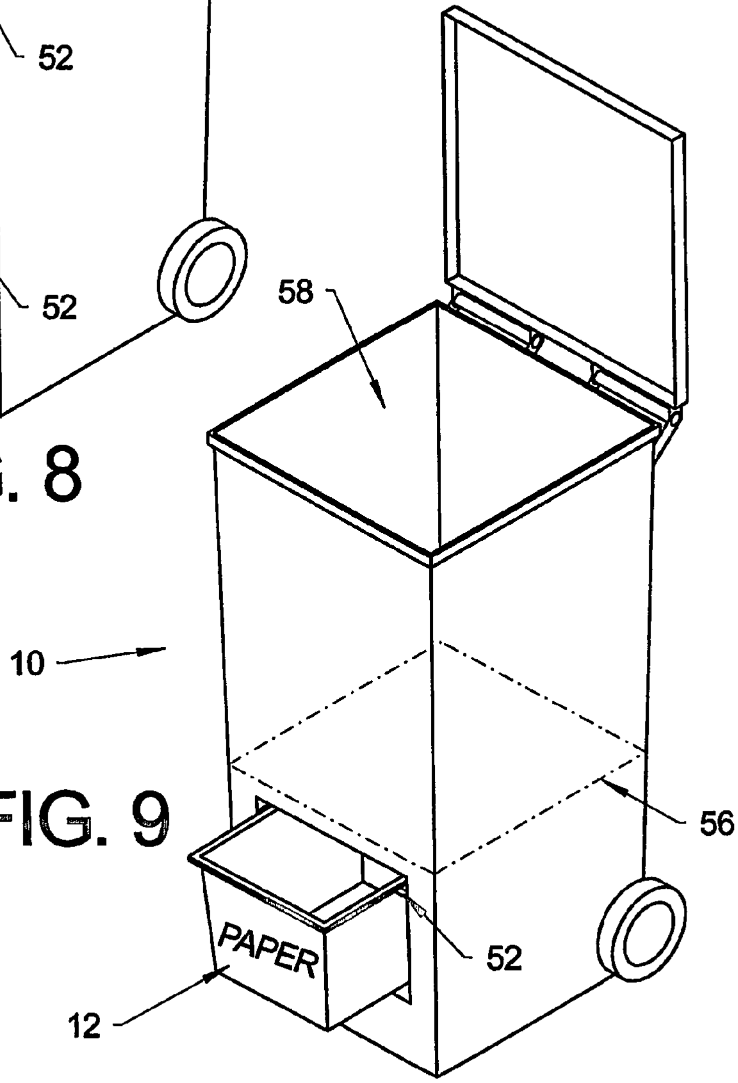
FIG. 9 shows a fourth embodiment of the invention.

The fourth embodiment of the invention, as shown in FIG. 9, uses the technique of the third embodiment to provide a single recycling box 12 on runners 52 near the bottom of the wheelie bin 10 and includes a horizontal partition, as indicated by the dash-dot line 56, immediately above the recycling box 12 so that the space 58 above the partition 56 can be used for general refuse.

The fifth embodiment of the invention will now be described with reference to FIGS. 10 to 12. The fifth embodiment employs a conventional wheelie bin 10 as described above with reference to FIG. 1 of the drawings. For simplicity in FIGS. 10 and 12, the lid, wheels and handle of the wheelie bin 10 are not shown. The wheelie bin is modified as shown in FIG. 10 by cutting three rectangular holes 46 in the front wall 18 of the bin (similarly to as described with reference to FIG. 3). Also, two slots 60,61 are cut in each of the side walls 22 of the bin 10, each slot 60,61 being generally level with a respective rail portion 62,63 of the front wall 18 between the holes 46, each slot 60,61 being adjacent the rear wall 20 of the bin, and the slots 60,61 being a constant distance D from the front wall 18 of the bin 10 despite the front and rear walls 18,20 converging towards each other in the downwards direction. The fifth embodiment also employs three identical shelf mouldings 64 and two rails 66,68 as shown in FIG. 11. Each shelf moulding 64 comprises a rectangular floor 70 with short, upstanding walls 72,74 along its side and rear edges. Also, the front edges of the floor 70 and side walls 72 are provided with a double lip to form a channel 76 that faces downwardly from the front edge of the floor 70 and outwardly from the side walls 72. Furthermore, the rear edge of the floor 70 is provided with a double lip to form a channel 78 that faces downwardly from the rear edge of the floor 70. Each rail 66,68 is a formed by a moulded rectangular-section bar with notches 80,82 adjacent its ends. The distance between the notches 80 of the rail 66 is generally equal to the distance between the lower slots 60 in the side walls 22 of the wheelie bin 10, and the distance between the notches 82 of the rail 68 is generally equal to the distance between the upper slots 62 in the side walls 22 of the wheelie bin 10. The distances between the notches 80 and between the notches 82 therefore differ due to the side walls 22 of the bin 10 converging towards each other in the downwards direction.

In order to assemble the fifth embodiment of the invention, a first one of the shelf mouldings 64 is inserted into the bin 10, and the upper edge of the lower rail portion 84 of the front wall 18 of the bin 10 beneath the lower hole 46 is engaged in the front channel 76 of the shelf moulding 64, with the upturned ends of the front channel 76 engaging the lower portions of the sides of the lower hole 46. The rear channel 78 of the shelf moulding 64 is allowed to rest on the base 16 of the wheelie bin 10. Accordingly, the lower shelf moulding 64 is supported by the rail portion 84 of the front wall 18 of the bin 10 and by the base 16 of the bin 10. The rail 66 is then placed into the bin 10 and its ends are inserted into the lower slots 60 in the side walls 22 of the bin 10 with the notches 80 facing downwards and being engaged by the lower ends of the slots 60 so that the rail 66 is held in place. A second one of the shelf mouldings 64 is then inserted into the bin 10, and the upper edge of the rail portion 62 of the front wall 18 of the bin 10 beneath the middle hole 46 is engaged in the front channel 76 of the shelf moulding 64, with the upturned ends of the front channel 76 engaging the lower portions of the sides of the middle hole 46. The rail 66 is engaged in the rear channel 78 of the shelf moulding 64. Accordingly, the middle shelf moulding 64 is supported by the rail portion 62 of the front wall 18 of the bin 10 and by the rail 66 extending between the slots 60 in the side walls 22 of the bin 10. The rail 68 is then placed into the bin 10 and its ends are inserted into the upper slots 61 in the side walls 22 of the bin 10 with the notches 82 facing downwards and being engaged by the lower ends of the slots 61 so that the rail 68 is held in place. The third shelf moulding 64 is then inserted into the bin 10, and the upper edge of the rail portion 63 of the front wall 18 of the bin 10 beneath the upper hole 46 is engaged in the front channel 76 of the shelf moulding 64, with the upturned ends of the front channel 76 engaging the lower portions of the sides of the upper hole 46. The rail 68 is engaged in the rear channel 78 of the shelf moulding 64. Accordingly, the upper shelf moulding 64 is supported by the rail portion 63 of the front wall 18 of the bin 10 and by the rail 68 extending between the slots 61 in the side walls 22 of the bin 10. The assembled apparatus is shown in FIG. 12.

A modification to the fifth embodiment is shown in FIG. 13. The rear channel 78 of each shelf moulding 64 is closed, rather than open, at its bottom to form a rectangular passageway 84 extending across the rear of the shelf moulding 64. Also, instead of employing two different rails 66,68, four identical half-rails are used, each similar to slightly less than half of the length of the rail 66 of FIG. 11. The positions of the half-rails in the passageway 84 can therefore be adjusted so as to suit the different spacings between slots 60 and between the slots 61 in the side walls 22 of the bin 10.

The sixth embodiment of the invention will now be described with reference to FIGS. 14 to 17. As shown in FIG. 14, the sixth embodiment employs a conventional wheelie bin 10 that is modified similarly to that shown in FIG. 10 by cutting three rectangular holes 46 in the front wall 18 of the bin; however, slots 60,61 are not cut in the side walls 22 of the bin 10. The sixth embodiment also employs three identical shelf mouldings 86 and eight identical moulded rods 88 as shown in FIG. 15. Each shelf moulding 86 comprises a rectangular floor 90 with short, upstanding walls 92,94 inset from its side and rear edges. The size of the floor 90 is such that it is a snug fit in the bin 10 at the level of the upper edge of the rail portion 63 formed below the upper hole 46 in the front wall 18 of the bin 10. The floor 90 has a cut or break line 96 marked on it or formed in it (for example by thinning of the thickness of the floor 90) inset from the side and rear edges of the floor 90, such that when the marginal side and rear edges of the floor 90 are cut or broken off along the line 96, the size of the remainder of the floor 90 is such that is a snug fit in the bin 10 at the level of the upper edge of the rail portion 62 formed below the middle hole 46 in the front wall 18 of the bin 10. The floor 90 also has another cut or break line 98 marked on it or formed in it, further inset from the side and rear edges of the floor 90, such that when the marginal side and rear edges of the floor 90 are cut or broken off along the line 98, the size of the remainder of the floor 90 is such that is a snug fit in the bin 10 at the level of the upper edge of the rail portion 84 formed below the lower hole 46 in the front wall 18 of the bin 10. Between each side wall 92 and the inner cut/break line 98, a pair of sockets 100 are formed on the upper surface of the floor 90. Also, four sockets 102 are formed on the lower surface of the floor 90, each beneath a respective one of the upper sockets 100, but offset rearwardly therefrom.

In order to assemble the sixth embodiment of the invention, the marginal edges of the floor 90 of a first one of the shelf mouldings 86 are cut or broken off along the inner cut/break line 98, and the shelf moulding 86*a* thus formed is placed in the wheelie bin 10 so that its lower sockets 102 rest on the base 16 of the bin 10. The height of the lower sockets 102 is such that the upper surface of the floor 90 of the shelf moulding 86*a* is level with the upper edge of the rail portion 84 beneath the lower hole 46 in the front wall 18 of the bin 10, and the spacing between the side walls 92 of the shelf mouldings 86 is equal to the width of the holes 46 in the front wall 18 of the bin 10. The lower ends of four of the rods 88 are then placed in the four upper sockets 100 of the shelf moulding 86*a* The marginal edges of the floor 90 of a second one of the shelf mouldings 86 are cut or broken off along the outer cut/break line 96, and the shelf moulding 86*b* thus formed is placed in the wheelie bin 10 so that its lower sockets 102 engage the uppers ends of the four rods 88. The length of the rods 88 is such that the upper surface of the floor 90 of the shelf moulding 86*b* is level with the upper edge of the rail portion 62 beneath the middle hole 46 in the front wall 18 of the bin 10. The lower ends of the remaining four rods 88 are then placed in the four upper sockets 100 of the shelf moulding 86*b*. The third shelf moulding 86 is then placed in the wheelie bin 10 so that its lower sockets 102 engage the uppers ends of the upper four rods 88. The offset between the upper and lower sockets 100,102 of each shelf moulding 86,86*a*,86*b* is such that, when assembled, the rods 88 are vertical despite the front edges of the shelf mouldings 86,86*a*,86*b* not being vertically aligned. The assembled shelf mouldings 86,86*a*,86*b* and rods 88, without the bin 10, are shown in FIG. 16, and the complete assembled apparatus is shown in FIG. 17.

In use of the fifth and sixth embodiments of FIGS. 10 to 17, recycling boxes 12 as described above in connection with the first to fourth embodiments may be slid though the holes 46 in the front wall 18 of the bin 10 into the compartments above the shelf mouldings 64 or 86,86*a*,86*b*. Although not shown in FIGS. 10 to 17, the bin 10 has a lid 24, wheels 28 and handles 26 similarly to the other embodiments and is stackable in the fashion shown in FIG. 18. Also, the bin 10 may be provided with a top tray 50 as described above with reference to FIG. 7 or 8.

The techniques of the fifth and sixth embodiments of the invention may be combined. For example, the technique using the channel 76 to support the front of each shelf moulding on the front wall 18 of the bin 10 may be combined with the technique using the sockets 100,102 and rods 88 to support the rear, or the rear and the front, of each shelf moulding.

In the fifth and sixth embodiments, the exposed cut edges of the holes 46 in the front wall 18 of the bin 10 may be covered with an edging strip.

Various modifications and developments may be made to the embodiments of the invention described above. For example, in the embodiment of FIGS. 3 to 5, the rear walls of the boxes 34 may be secured to:the rear wall 20 of the wheelie bin 10, for example with pop-rivets. Also, the compartment moulding 14 may be arranged to be inserted into the wheelie bin 10 through its open top. In the embodiments of FIGS. 10 to 13, the shelf mouldings may be of different sizes so that they extend to the side and rear walls 20,22 of the wheelie bin 10, where they may be attached by pop-rivets or the like. In all of the embodiments, the opening or openings in the front wall 18 of the wheelie bin 10 may be finished with a cowling which is attached to the front wall 18 from the outside or the inside so as to provide a neat appearance. In the embodiments in which the recycling boxes 12 are supported on a shelf or platform 36,70,90, the shelf or platform may be slightly dished so as to tend to retain the recycling box 12 in place in the wheelie bin 10.

In the case where the local authority does not collect all types of recyclable waste on the same day, the side of the bin 10 may be provided with a pouch into which the collector can slip a card listing the collection dates and the types of waste collected on each date. One or more of the recycling boxes 12 may be provided with one or more vertical partition walls so that it can be used for more than one type of recyclable waste. The lid 24 of the bin 10 may be flat and may be used by the collector as a platform on which to place the recycling boxes while their contents are checked. One or more hooks may be provided on the bin, for example near the handle, onto which bags of other types of recyclable waste could be hung ready for collection. For example, local authorities could provided residents with distinctive bags for use when disposing of batteries.

It should be noted that the embodiments of the invention have been described above purely by way of example and that many modifications and developments may be made thereto within the scope of the present invention.

The invention claimed is:

1. An apparatus for use in the storage and transportation of recyclable waste, the apparatus comprising:

a housing (10) having a bottom (16) for standing on the ground, a rear wall (20), and a pair of opposed side walls (22), the housing providing a space (48) accessible from the front of the housing and arranged to receive at least one recycling box (12) having a base (30), four side walls (32) and an open top;

supporting means (14,52,64,86) for supporting the or each recycling box in the space such that the or each recycling box can be slid into the housing from the front and such that when the or each recycling box is in the housing the front-facing side wall(s) of the recycling box(es) substantially close(s) the front of the housing and the or each recycling box is covered;

a handle (26) adjacent the top and rear of the housing: and a pair of wheels (28) arranged to be assembled with the housing adjacent the bottom and rear of the housing such that the housing can be tipped rearwardly using the handle so that the wheels engage the ground, so that the bottom of the housing no longer engages the ground and so that the apparatus can be moved on the wheels using the handle to move it;

wherein the supporting means is arranged to be assembled with the housing; and the housing is arranged such that, prior to assembly of the supporting means and the wheels with the housing and prior to insertion of the recycling box(es), a plurality of identical such housings can be stacked one substantially inside another so that said one housing extends into said space of said other housing.

2. An apparatus as claimed in claim 1, wherein the housing provides a plurality of such spaces arranged one above another in the housing.

3. An apparatus as claimed in claim 1, wherein the supporting means (14,64,86) provides a platform (36,70,90) beneath the space onto which the recycling box(es) can be slid.

4. An apparatus as claimed in claim 1, wherein the supporting means provides a pair of runners (52) to either side of the space onto which opposed lips (33) of the recycling box can be slid.

5. An apparatus as claimed in claim 1, wherein the housing is formed as a moulding (10) providing at least the side walls and the rear wall of the housing.

6. An apparatus as claimed in claim 5, wherein the housing is substantially identical to a housing of a standard wheelie bin except for the omission of at least part of the front wall (18) thereof.

7. An apparatus as claimed in claim 1, wherein the supporting means includes an element (64) that is arranged to be supported at least in part by a front wall of the housing.

8. An apparatus as claimed in claim 2, wherein the supporting means includes at least two elements (86) at least one (**86*b*) of which is arranged to be supported at least in part by another (86*a***) of the elements.

9. An apparatus as claimed in claim 1, in combination with at least one such recycling box (12).

10. An apparatus as claimed in claim 9, wherein the housing provides a plurality of such spaces arranged one above another in the housing and there is a plurality of such recycling boxes.

11. A method of manufacture of an apparatus for use in the storage and transportation of recyclable waste, the apparatus comprising a housing (10) having a bottom (16) for standing on the ground, a rear wall (20), and a pair of opposed side walls (22), the housing providing a space (48) accessible from the front of the housing and, arranged to receive at least one recycling box (12) having a base (30), four side walls (32) and an open top, the supporting means (14,52,64,86) for supporting the or each recycling box in the space such that the or each recycling box can be slid into the housing from the front and such that when the or each recycling box is in the housing the front-facing side wall(s) of the recycling box(es) substantially close(s) the front of the housing and the or each recycling box is covered, a handle (26) adjacent the top and rear of the housing,e and a pair of wheels (28) arranged to be assembled with the housing adjacent the bottom and rear of the housing such that the housing can be tipped rearwardly using the handle so that the wheels engage the ground, so that the bottom of the housing no longer engages the ground and so that the apparatus can be moved on the wheels using the handle to move it, wherein the supporting means is arranged to be assembled with the housing; and the housing is arranged such that, prior to assembly of the supporting means and the wheels with the housing and prior to insertion of the recycling box(es), a plurality of identical such housings can be stacked one substantially inside another so that said one housing extends into said space of said other housing, the method comprising the steps of: moulding a housing of a wheelie bin (10), removing at least part of a front wall (18) therefrom to form the housing of the apparatus (10), manufacturing the supporting means, and attaching the supporting means to the housing.

12. A method of manufacture of an apparatus for use in the storage and transportation of recyclable waste, the apparatus comprising a housing (10) having a bottom (16) for standing on the ground, a rear wall (20), and a pair of opposed side walls (22), the housing providing a space (48) accessible from the front of the housing and, arranged to receive at least one recycling box (12) having a base (30), four side walls (32) and an open top, supporting means (14,52,64,86) for supporting the or each recycling box in the space such that the or each recycling box can be slid into the housing from the front and such that when the or each recycling box is in the housing the front-facing side wall(s) of the recycling box(es) substantially close(s) the front of the housing and the or each recycling box is covered a handle (26) adjacent the top and rear of the housing, and a pair of wheels (28) arranged to be assembled with the housing adjacent the bottom and rear of the housing such that the housing can be tipped rearwardly using the handle so that the wheels engage the ground, so that the bottom of the housing no longer the ground and so that the apparatus can be moved on the wheels using the handle to move it, wherein the supporting means is arranged to be assembled with the housing; and the housing is arranged such that, prior to assembly of the supporting means and the wheels with the housing and prior to insertion of the recycling box(es), a plurality of identical such housings can be stacked one substantially inside another so that said one housing extends into said space of said other housing, the method comprising the steps of: modifying a mould for a housing of a wheelie bin so that the mould produces a housing (10) substantially identical to a housing of a wheelie bin except for the omission of at least part of a front wall (18) thereof, moulding such a housing, manufacturing the supporting means, and attaching the supporting means to the housing.

13. A method as claimed in claim 11, wherein:

a plurality of such housings are manufactured, the housings are stacked one substantially inside another at a first location so that said one housing extends into said space of said other housing, the stacked housings are transported to a second location remote from the first location, the housings are unstacked at the second location, and the supporting means are subsequently attached to the housings.

14. A method as claimed in claim 12, wherein:

a plurality of such housings are manufactured, the housings are stacked one substantially inside another at a first location so that said one housing extends into said space of said other housing, the stacked housings are transported to a second location remote from the first location, the housings are unstacked at the second location, and the supporting means are subsequently attached to the housings.

15. An apparatus as claimed in claim 1, wherein the supporting means comprises a platform (70) that is arranged to be attached to and supported at least in part by the side walls of the housing.

* * * * *